United States Patent
Houle (10) Patent No.: US 10,982,603 B2
(45) Date of Patent: Apr. 20, 2021

(54) METHOD FOR CONTROLLING A MOTOR OF A VEHICLE

(71) Applicant: BOMBARDIER RECREATIONAL PRODUCTS INC., Valcourt (CA)

(72) Inventor: Jean-Philippe Houle, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/343,167

(22) PCT Filed: Oct. 5, 2017

(86) PCT No.: PCT/IB2017/056162
§ 371 (c)(1),
(2) Date: Apr. 18, 2019

(87) PCT Pub. No.: WO2018/078473
PCT Pub. Date: May 3, 2018

(65) Prior Publication Data
US 2019/0316532 A1   Oct. 17, 2019

Related U.S. Application Data

(60) Provisional application No. 62/414,849, filed on Oct. 31, 2016.

(51) Int. Cl.
*F16H 9/18* (2006.01)
*F16H 63/50* (2006.01)
(Continued)

(52) U.S. Cl.
CPC ........... *F02D 41/0002* (2013.01); *F02D 9/02* (2013.01); *F02D 41/0225* (2013.01); *F16H 9/18* (2013.01);
(Continued)

(58) Field of Classification Search
CPC .... F02D 41/0002; F02D 41/0225; F02D 9/02; F16H 9/18; F16H 63/50; B60W 50/00;
(Continued)

(56) References Cited

U.S. PATENT DOCUMENTS

| 5,514,050 A | 5/1996 | Bauerle et al. |
| 9,002,595 B2 | 4/2015 | Davis et al. |
| 2004/0079322 A1 | 4/2004 | Shiraishi et al. |
| 2009/0319137 A1 * | 12/2009 | Miyanoo ............... F02D 11/105 701/54 |

(Continued)

OTHER PUBLICATIONS

International Search Report of PCT/IB2017/056162, Lee W, Young, dated Apr. 5, 2018.

*Primary Examiner* — George C Jin
(74) *Attorney, Agent, or Firm* — BCF LLP (57) ABSTRACT

A method for controlling a motor of a vehicle and the vehicle are presented. The vehicle includes the motor, a control unit, a continuously variable transmission (CVT) comprising a primary pulley, a secondary pulley, and a belt looped around the primary and secondary pulleys, the belt transmitting torque between the primary and secondary pulleys and at least one ground engaging member operatively connected to the secondary pulley. The method is performed at least in part by the control unit. The method comprises determining a CVT ratio of the CVT; determining a current power output of the motor; determining a power boundary based in part on the CVT ratio; determining, when the current power output of the motor is greater than the power boundary, a torque setting based at least in part on the CVT ratio; and controlling the motor to operate under conditions corresponding to the torque setting.

17 Claims, 6 Drawing Sheets

(51) Int. Cl.
*F02D 41/00* (2006.01)
*F02D 9/02* (2006.01)
*F02D 41/02* (2006.01)
*B60W 50/00* (2006.01)

(52) U.S. Cl.
CPC ............ *F16H 63/50* (2013.01); *B60W 50/00* (2013.01); *B60W 2510/0638* (2013.01); *B60W 2510/0657* (2013.01); *B60W 2510/1005* (2013.01); *B60W 2510/107* (2013.01); *B60W 2555/20* (2020.02); *B60W 2710/0666* (2013.01); *F02D 2200/101* (2013.01); *F02D 2200/1002* (2013.01); *F02D 2250/26* (2013.01); *F16H 2063/508* (2013.01)

(58) Field of Classification Search
CPC . B60W 2510/1005; B60W 2510/0657; B60W 2510/0638; B60W 2710/066
See application file for complete search history.

(56) References Cited

U.S. PATENT DOCUMENTS

| | | | |
|---|---|---|---|
| 2010/0087997 A1* | 4/2010 | Tsukamoto | ............ F16H 59/72 701/60 |
| 2010/0292899 A1 | 11/2010 | Kitaori et al. | |
| 2014/0080663 A1 | 3/2014 | Nakanishi et al. | |
| 2015/0051767 A1 | 2/2015 | Mohri | |
| 2015/0353090 A1* | 12/2015 | Yoshino | ............ B60W 30/188 701/54 |
| 2018/0211454 A1 | 7/2018 | Carlson et al. | |

* cited by examiner

METHOD FOR CONTROLLING A MOTOR OF A VEHICLE

CROSS-REFERENCE

The present application claims priority to U.S. Provisional Patent Application No. 62/414,849, entitled "Method for Controlling a Motor of a Vehicle," filed on Oct. 31, 2017, the entirety of which is incorporated herein by reference.

TECHNICAL FIELD

The present technology relates to methods for controlling a motor in a vehicle.

BACKGROUND

Certain wheeled vehicles with an internal combustion engine are provided with a continuously variable transmission (CVT) to transfer torque from the engine to the wheels. A CVT has a primary pulley, a secondary pulley and a belt looped around the pulleys to transmit torque between the pulleys.

For vehicles with CVTs using rubber belts, certain ranges of CVT ratios and engine speeds can cause heating of the CVT pulleys and/or the CVT belt. Certain of these ranges can cause more heating than others. For example, at the beginning of movement of the vehicle, there can be substantial slipping between the belt and the primary pulley until the pulleys are synchronized. If the CVT were to remain in this configuration and at this speed, parts of the CVT could overheat and may eventually become damaged.

A similar situation can arise when the vehicle is under load, such as when it is pulling a heavy load or traveling through deep mud or sand, where there can be substantial slipping between the belt and one or both of the pulleys. If operated in these conditions for an extended time, the CVT can generate too much heat and may eventually cause the CVT to become damaged.

If a motor to which the CVT is connected develops more power than that for which the CVT was originally designed for, yet another situation can arise where the CVT can generate too much heat and may become damaged, especially if there is a large excess of power applied or if that additional power is applied over a long period of time.

It would therefore be desirable to provide a method for allowing a vehicle with a CVT to operate under high load conditions without producing too much heating the may induce damage in the CVT.

SUMMARY

It is an object of the present to ameliorate at least some of the inconveniences present in the prior art.

According to an aspect of the present technology, there is provided a method for controlling a motor of a vehicle. The vehicle includes the motor; a control unit; a continuously variable transmission (CVT) including a primary pulley operatively connected to the motor, a secondary pulley, and a belt looped around the primary and secondary pulleys, the belt transmitting torque between the primary and secondary pulleys; and at least one ground engaging member operatively connected to the secondary pulley; the method being performed at least in part by the control unit, the method including determining a CVT ratio of the CVT; determining a current power output of the motor; determining a pre-determined power boundary based at least in part on the CVT ratio; determining, when the current power output of the motor is greater than the pre-determined power boundary, a torque setting based at least in part on the CVT ratio; and controlling the motor to operate under conditions corresponding to the torque setting.

In some implementations of the present technology, the motor is an internal combustion engine, the current power output of the motor is a current output of the engine, and controlling the motor to operate under conditions corresponding to the torque setting includes controlling the engine to operate under conditions corresponding to the torque setting.

In some implementations of the present technology, controlling the engine comprises controlling the engine to operate under conditions corresponding to the torque setting if the torque setting is less than a torque requested by an operator.

In some implementations of the present technology, the pre-determined power boundary is retrieved, based on the CVT ratio from a stored power boundary data set.

In some implementations of the present technology, the method further comprises determining a temperature, the temperature being at least one of an ambient temperature and a temperature within a housing of the CVT; and the pre-determined power boundary is retrieved from a stored power boundary data set based on at least one of the CVT ratio and the temperature.

In some implementations of the present technology, determining the current power output of the engine comprises determining the current torque output; determining a current engine speed; and multiplying the current engine speed by the current torque output.

In some implementations of the present technology, determining the current engine speed includes determining a speed of rotation of a crankshaft operatively connecting the engine to the at least one ground engaging member.

In some implementations of the present technology, determining the CVT ratio comprises determining a speed of rotation of a crankshaft operatively connecting the engine to the primary pulley; and determining a speed of a drive axle, the drive axle being operatively connected between the secondary pulley and the at least one ground engaging member, the CVT ratio being proportional to the speed of the crankshaft divided by the speed of the drive axle.

In some implementations of the present technology, the method further comprises, when the current output power of the engine exceeds the pre-determined power boundary, determining the torque setting based at least in part on an overrun time, the overrun time corresponding to a time elapsed since the power output of the engine has exceeded the pre-determined power boundary; and controlling the engine to operate under conditions corresponding to the torque setting, if the torque setting is less than a torque requested by an operator.

In some implementations of the present technology, determining the torque setting comprises determining an accumulated energy based at least in part on the power difference and an overrun time; determining an energy ratio by dividing a transient energy value by the accumulated energy; determining a theoretical maximum torque by dividing the pre-determined power boundary by the current engine speed; and multiplying the theoretical maximum torque by the energy ratio.

In some implementations of the present technology, the transient energy value is stored in storage operatively connected to the control unit.

In some implementations of the present technology, controlling the engine to operate under conditions corresponding to the torque setting comprises positioning a valve controlling a supply of air to the engine at a position causing the engine to reduce torque to the torque setting.

In some implementations of the present technology, the valve is a throttle valve of a throttle body.

In some implementations of the present technology, the method further comprises, subsequent to controlling the engine to operate under conditions corresponding to the torque setting, determining a revised CVT ratio of the CVT; retrieving a revised power boundary based at least in part on the revised CVT ratio; determining a revised power output of the engine; and determining a revised power difference by subtracting the revised power boundary from the revised power output of the engine.

In some implementations of the present technology, the method further comprises, when the revised power output is less than the revised power boundary, determining an energy reduction based on the power difference and a reduction time, the reduction time corresponding to a time elapsed since power output of the engine has been less the revised power boundary; determining a revised accumulated energy by subtracting the energy reduction from the accumulated energy previously determined; determining a revised energy ratio by dividing the transient energy value by the revised accumulated energy; determining a revised torque setting based on the revised energy ratio; and controlling the engine to operate under conditions corresponding to the revised torque setting, if the revised torque setting is less than a torque requested by an operator.

In some implementations of the present technology, the method further comprises, when the revised power output is greater than the revised power boundary, determining a revised torque output; determining a revised accumulated energy based at least on the revised power difference; determining a revised energy ratio by dividing the transient energy value by the revised accumulated energy; determining a revised torque setting based at least on the revised energy ratio; and controlling the engine to operate under conditions corresponding to the revised torque setting, if the revised torque setting is less than a torque requested by an operator.

According to another aspect of the present technology, there is provided a vehicle including a motor; a continuously variable transmission (CVT) including a primary pulley operatively connected to the motor, a secondary pulley, and a belt looped around the primary and secondary pulleys, the belt transmitting torque between the primary and secondary pulleys; at least one ground engaging member operatively connected to the secondary pulley; and a control unit configured to perform the method of according to the aspect described above.

According to yet another aspect of the present technology, there is provided a method for controlling an internal combustion engine of a vehicle. The vehicle comprises the internal combustion engine; a control unit; a continuously variable transmission (CVT) including: a primary pulley operatively connected to the engine, a secondary pulley, and a belt looped around the primary and secondary pulleys, the belt transmitting torque between the primary and secondary pulleys; and at least one ground engaging member operatively connected to the secondary pulley. The method is performed at least in part by the control unit. The method comprises determining that a current power output of the engine has exceeded a pre-determined power boundary of the engine; when the current power output of the engine has exceeded the pre-determined power boundary, controlling the engine to reduce a torque output of the engine to a limited torque setting.

In some implementations of the present technology, the pre-determined power boundary is based at least in part on a current CVT ratio of the CVT.

In some implementations of the present technology, the method further comprises, when the current power output of the engine has exceeded the pre-determined power boundary, prior to controlling power output of the engine, allowing energy to accumulate in the CVT, the energy accumulated being related to heating of the CVT; and controlling the engine to reduce the torque output of the engine to the limited torque setting when the energy accumulated reaches an accumulation limit.

In some implementations of the present technology, the method further comprises, determining that the energy accumulated is greater than zero but less than the accumulation limit; and when the energy the engine accumulated is greater than zero but less than the accumulation limit, controlling the engine to reduce the torque output of the engine to a reduced torque, the reduced torque being lower than a current torque but greater than the limited torque.

In some implementations of the present technology, controlling the engine to reduce the torque output of the engine comprises controlling the engine to operate under conditions corresponding to the limited torque setting if the limited torque setting is less than a torque requested by an operator.

For the purposes of the present application, terms related to spatial orientation such as forward, rearward, front, rear, upper, lower, left, and right, are as they would normally be understood by a driver of the vehicle sitting thereon in a normal driving position with the vehicle being upright and steered in a straight ahead direction.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a side-by-side vehicle (SSV) 10. However, it is contemplated that aspects of the present technology could be used in other types of vehicles having a continuously variable transmission (CVT) such as a straddle-type all-terrain vehicle (ATV), a snowmobile, a motorcycle, and a three-wheeled vehicle to name a few.

Figure 1:
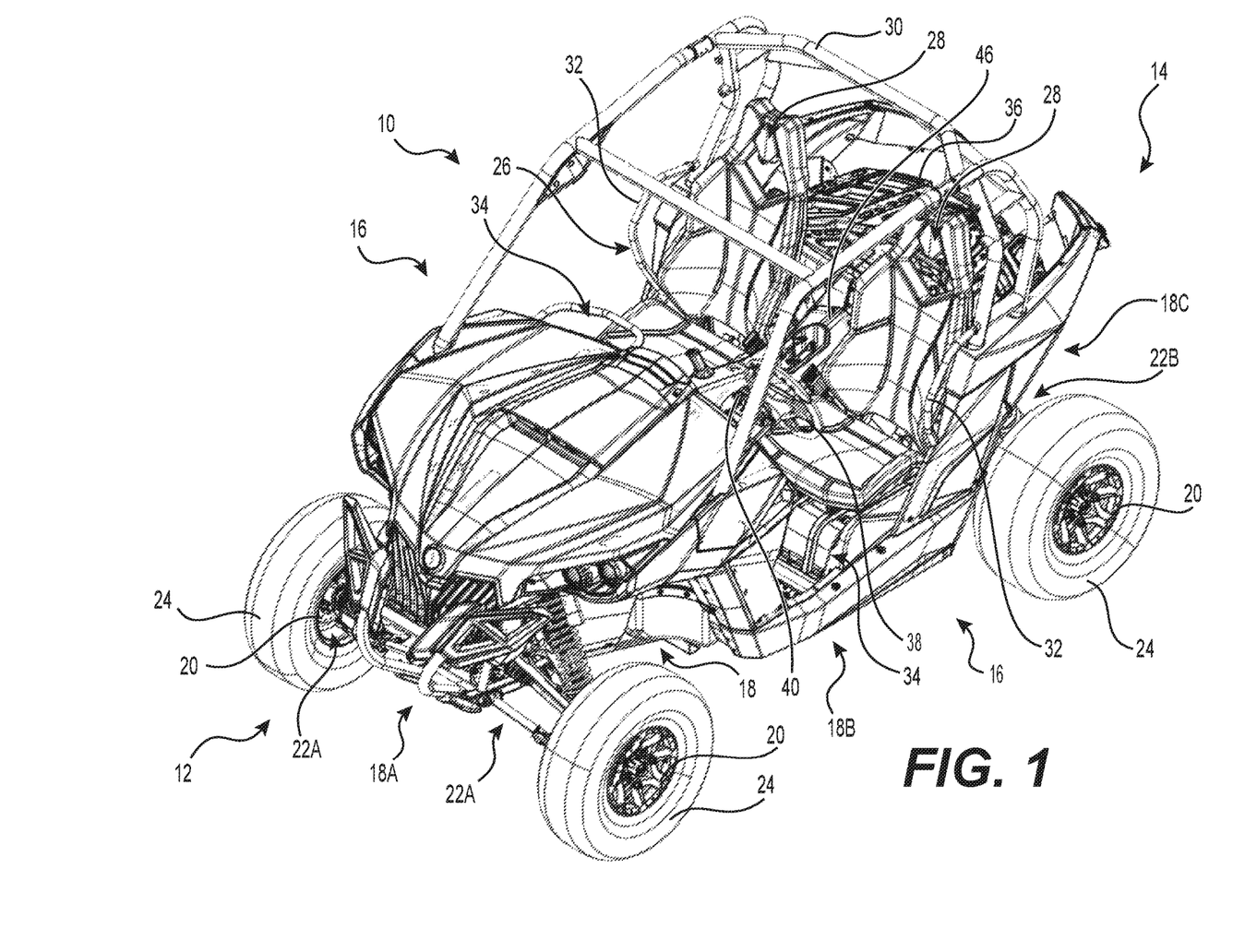
FIG. 1 is a perspective view taken from a front, left side of a side-by-side vehicle (SSV)

The SSV 10 is illustrated in FIG. 1. The SSV 10 has a front end 12, a rear end 14, and two lateral sides 16 (left and right). The SSV 10 includes a frame 18 to which a vehicle body is mounted. The frame 18 has a front portion 18A, a middle portion 18B and a rear portion 18C. A pair of front wheels 20 is suspended from the front portion 18A of the frame 18 via front suspension assemblies 22A. A pair of rear wheels 20 is suspended from the rear portion 18C of the frame 18 via rear suspension assemblies 22B. Each of the four wheels 20 has a tire 24. A cockpit area 26 is disposed in the middle portion 18B of the frame 18. The cockpit area 26 comprises two seats 28 (left and right). Each seat 28 is a bucket seat having a seat base and a backrest. It is contemplated that the seats 28 could be other types of recumbent seats. Each seat 28 is also provided with a seat belt (not shown). The left and right seats 28 are mounted laterally beside each other to accommodate a driver and a passenger respectively of the SSV 10 (i.e. riders).

A roll cage 30 is connected to the frame 18 and is disposed above the cockpit area 26. The roll cage 30 is an arrangement of metal tubes that contributes to protecting the riders. The roll cage 30 has several attachment points to the frame 18. The roll cage 30 further includes a pair of lateral restraining members 32, one on each side of a rear part of the roll cage 30. The lateral restraining members 32 extend forward from the rear part of the roll cage 30. The lateral restraining members 32 are U-shaped tubes which help protect an upper body of the riders. It is contemplated that the lateral restraining members 32 could have a different shape. It is also contemplated that the restraining members 32 could be omitted.

The cockpit area 26 is open at the two lateral sides 16 of the SSV 10, forming two lateral passages 34 (left and right), through which the riders can ingress and egress the SSV 10.

A cargo rack 36 is mounted to the frame portion 18C of the frame 18 rearward of the seats 28. It is contemplated that the cargo rack 36 could be replaced by a cargo box pivotally mounted to the frame portion 18C of the frame 18 rearward of the seats 28. It is contemplated that the cargo rack 36 could be omitted.

A steering device including a steering wheel 38 is disposed in front of the left seat 28. It is contemplated that the steering wheel 38 could be disposed in front of the right seat 28. The steering device is operatively connected to the two front wheels 20 to permit steering of the SSV 10. A display cluster 40 is disposed in front of the steering wheel 38. A throttle operator in the form of a throttle pedal 42 (shown in FIGS. 2 and 3) is disposed over the floor of the cockpit area 26 below the steering wheel 38 and in front of the left seat 28.

Figure 2:
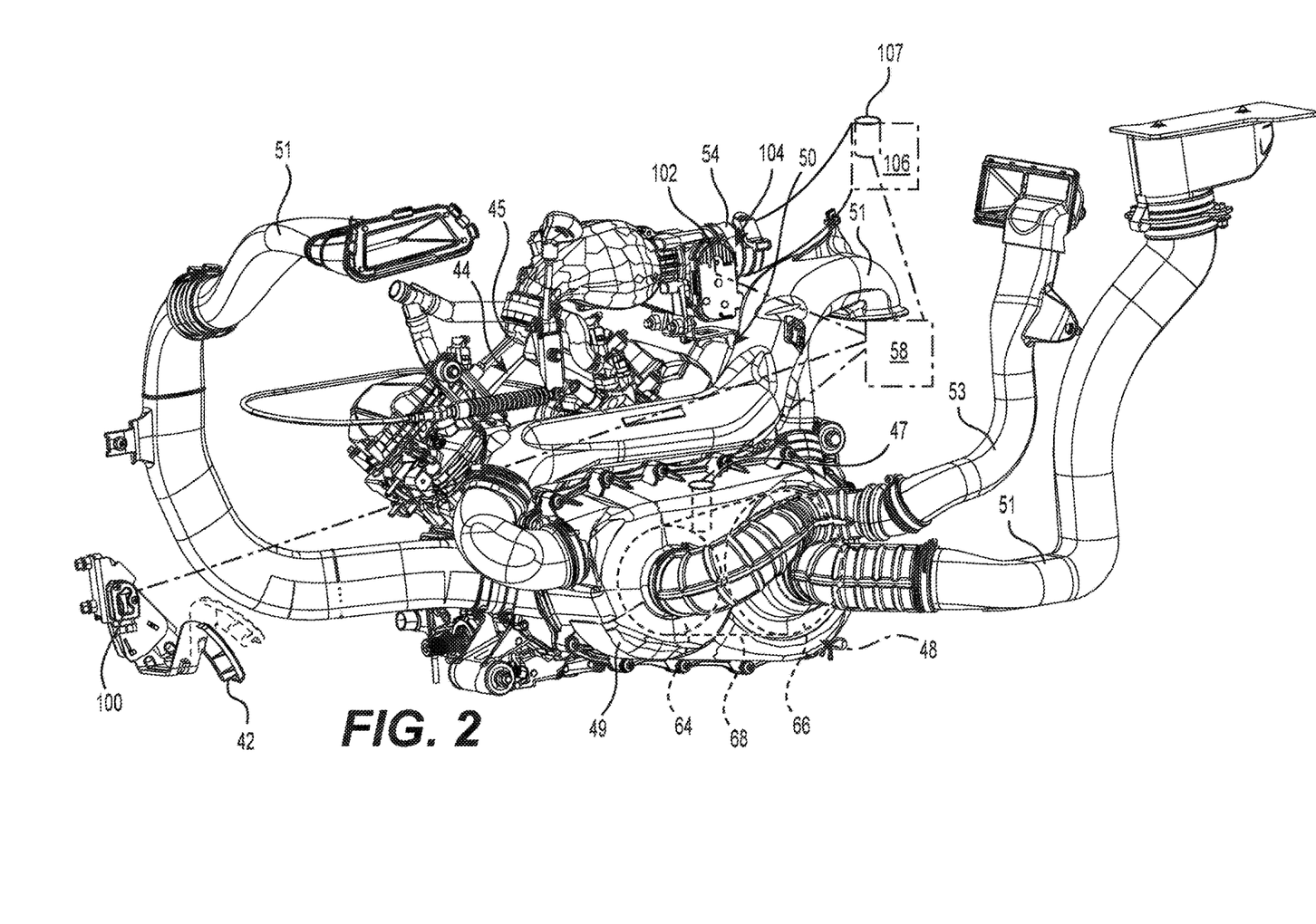
FIG. 2 is a perspective view taken from a front, left side of portions of a power train and some associated components of the SSV of FIG. 1.
Figure 3:
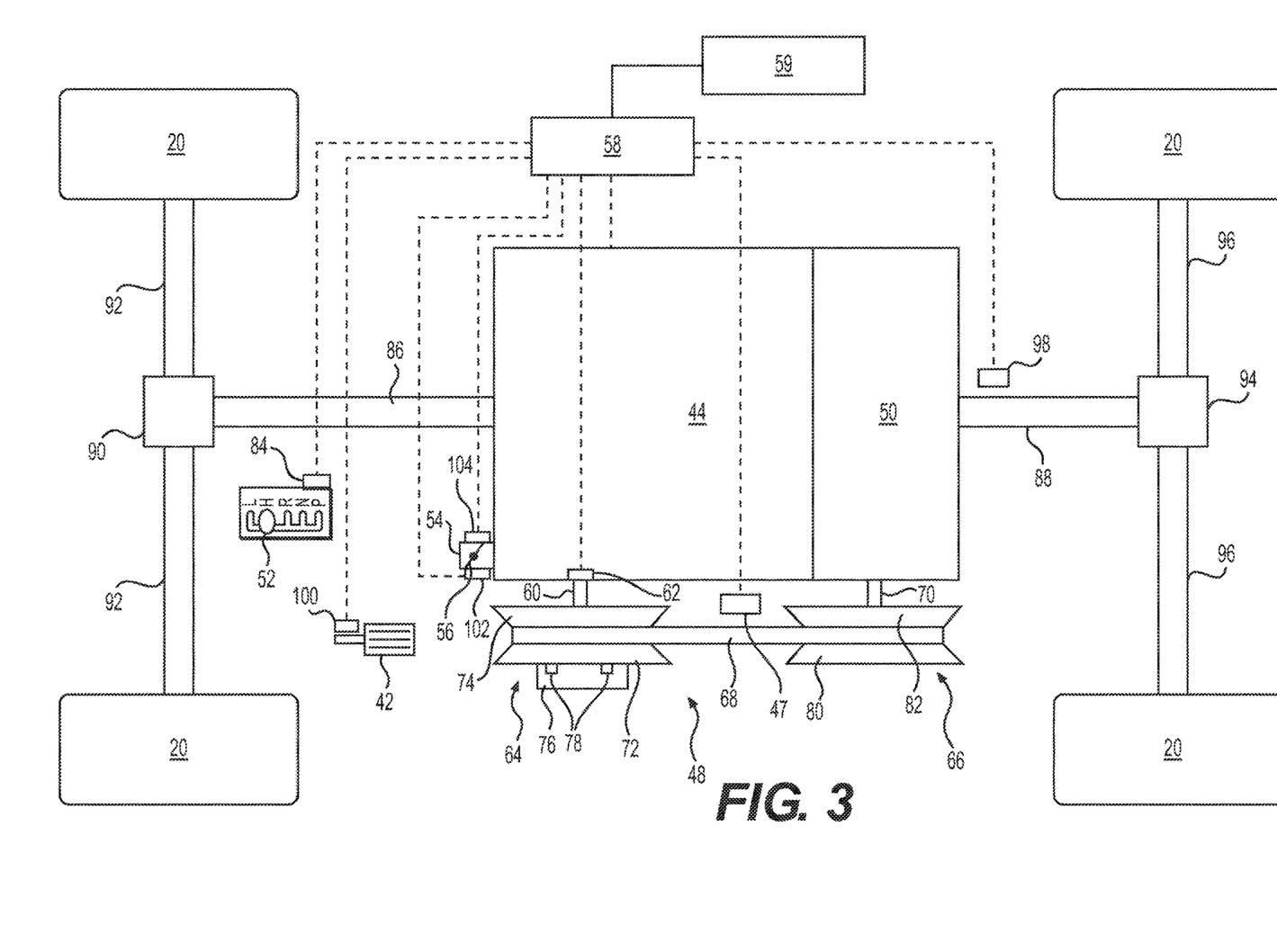
FIG. 3 is a schematic representation of the power train and some associated components of the SSV of FIG. 1.

Turning now to FIGS. 2 and 3, a power pack, a power train and some associated components of the SSV 10 will be described. A motor 44 of the vehicle 10, as is illustrated in FIG. 2 and shown schematically in FIG. 3, is mounted to the middle portion 18B of frame 18 and has a portion disposed between the right and the left seats 28. The motor 44 is operatively connected to the four wheels 20 to propel the SSV 10, as will be described in greater detail below. It is contemplated that the motor 44 could be operatively connected only to the rear wheels 20 or could selectively switch between driving two and four wheels 20.

In the present implementation, the motor 44 is an internal combustion, four-stroke, V-twin engine 44. Accordingly, the engine 44 has two cylinders extending at an angle from each other. It is contemplated that other types of motors or engines could be used. For example, the engine 44 could be a two-stroke engine with in-line cylinders. It is also contemplated that the motor 44 could be, but is not limited to, an electric motor and a hybrid engine.

A console 46 positioned between the right and left seats 28 covers and separates the motor 44 from the driver and the passenger (FIG. 1). The console 46 defines in part a central cooling tunnel allowing air to flow from the front end 12 of the vehicle 10 to the rear end 14 of the vehicle to cool the engine 44. It is contemplated that the engine 44 could be located behind the seats 28 or under the cargo rack 36 in some implementations.

The engine 44 transmits torque to the wheels 20 via a continuously variable transmission (CVT) 48 and a gear-type transmission 50 (FIG. 3). A shifter 52 (FIG. 3) located near the steering wheel 38 enables a driver or operator to select one of a plurality of drive modes provided by the transmission 50. In the present implementation, the drive modes include park, neutral, reverse, low, and high. It is contemplated that the transmission 50 could have other drive modes.

The engine 44 has intake and exhaust ports. An air intake manifold 45, fluidly connected to an air box 106, is connected to the intake ports of the engine 44 to deliver air to the combustion chambers (not shown) of the engine 44. A throttle body 54 is fluidly connected to the intake manifold 45 and is disposed upstream thereof. The throttle body 54 has a throttle valve 56 pivotally supported therein.

During operation of the engine 44, the throttle valve 56 is movable between a wide open throttle valve position and a minimum position. In the wide open throttle valve position, a maximum amount of air for the current operating conditions is supplied to the engine 44. In the minimum position, the throttle valve 56 is slightly opened and a minimum amount of air for the current operating conditions is supplied to the engine 44. It is contemplated that the minimum position could correspond to the throttle valve 56 being fully closed, in which case apertures are provided in the throttle valve 56 or bypass passages are provided in the throttle body 54 to provide some air to the engine 44.

In order to control the operation of the engine 44, a control unit 58 is provided. The control unit 58 receives signals from various sensors (some of which are described below), and sends signals to various components to control the operation of these components based on the signals received from the sensors. A memory unit 59 is operatively connected to the control unit 58 to provide storage of information from the control unit 58 or to provide information to the control unit 58. Although only one control unit 58 is shown, it is contemplated that the control unit 58 could be replaced by multiple control units sharing the various functions of the control unit 58. Similarly, only one memory unit 59 is shown, but it is contemplated that the memory unit 59 could be replaced by multiple memory units sharing the various functions of the memory unit 59. Also, in the implementation described, the various components connected to the control unit 58 are electrically connected to the control unit 58 by wires. However, it is contemplated that one or more of the various components could be wirelessly connected to the control unit 58 to permit the wireless exchange of signals therebetween.

The engine 44 has an output shaft which, in the present implementation, is the crankshaft 60 of the engine 44. It is contemplated that the output shaft could be a shaft operatively connected to the crankshaft 60 of the engine 44. In such an implementation, it is contemplated that the output shaft could turn at a speed that is different from the speed of the crankshaft 60. An engine speed sensor 62 senses a speed of rotation of the crankshaft 60, which is referred to herein as the engine speed. The engine speed sensor 62 is electrically connected to the control unit 58 to send a signal representative of the engine speed to the control unit 58.

The CVT 48 has a primary pulley 64, sometimes known as a driving pulley 64, operatively connected to the engine 44. The CVT 48 also has a secondary pulley 66, sometimes known as a driven pulley 66, and a drive belt 68 looped around the pulleys 64, 66. In the present implementation, the drive belt 68 is a raw edge V-belt.

The CVT 48 is housed within a CVT housing 49, as can be seen in FIG. 2, with components of the CVT 48 represented in broken lines. Two CVT air intakes 51 are included with the CVT housing 49 for providing air flow into the CVT housing 49 for cooling the CVT 48. Two CVT exhaust outlets 53 are operatively connected to the CVT housing 49 for taking away heated air from the CVT 48 during operation of the SSV 10. It is contemplated that some implementations could include more or fewer intakes 51 and outlets 53 for the CVT housing 49.

A CVT temperature sensor 47 is included in the CVT housing 49 for sensing a temperature within the CVT housing 49, which is referred to herein as the CVT housing temperature. The temperature sensor 47 is electrically connected to the control unit 58 to send a signal representative of the CVT housing temperature to the control unit 58. A temperature sensor 107 is also included in the air box 106 to sense an ambient temperature of the air around or coming into the SSV 10. It is also contemplated that additional temperature sensors could be included, such as for sensing a temperature of the pulleys 64, 66 and/or the belt 68 more directly.

The primary pulley 64 is mounted on the crankshaft 60. As such, in the present implementation, the primary pulley speed is equal to the engine speed sensed by the engine speed sensor 62. In implementations where the output shaft is not the crankshaft 60, the primary pulley 64 is mounted on the output shaft and the primary pulley speed can be determined from the engine speed sensor 62 based on the transmission ratio between the crankshaft 60 and the output shaft. The secondary pulley 66 is mounted on an input shaft 70 of the transmission 50. It is contemplated that further components could connect the primary pulley 64 to the crankshaft 60, such as, for example, a centrifugal clutch between the engine 44 and the primary pulley 64.

The primary pulley 64 has a movable sheave 72, a fixed sheave 74 and a plurality of pivotable centrifugal weights 78. As the primary pulley speed increases, the centrifugal weights 78 push on the movable sheave 74 to move the movable sheave 74 toward the fixed sheave 72, thereby increasing the effective diameter of the primary pulley 64. A spring (not shown) biases the movable sheave 74 away from the fixed sheave 72. At low primary pulley speeds, the space between the fixed and movable sheaves 72, 74 is such that the belt 68 is not clamped by the primary pulley 64 which causes the primary pulley 64 to turn relative to the drive belt 68. As the primary pulley speed increases, the fixed and movable sheaves 72, 74 move closer together and the belt 68 is eventually sufficiently clamped between the fixed and movable sheaves 72, 74 that torque can be transferred between the primary pulley 64 and the belt 68. As the primary pulley speed increases, the effective diameter of the primary pulley 64 increases. It is contemplated that another type of centrifugally actuated primary or driving pulley could be used. It is also contemplated that a hydraulically actuated primary pulley could be used.

The secondary pulley 66 has a fixed sheave 80 and a movable sheave 82. The secondary pulley 66 includes a torque-sensitive mechanism that adjusts the effective diameter of the secondary pulley 66. The input shaft 70 of the transmission 50 on which the secondary pulley 66 is mounted engages an input gear (not shown) of the transmission 50. The transmission 50 contains a number of gears that can be selectively engaged to change the speed/torque ratio between the input and output of the transmission 50, and/or to change the direction of rotation of the input versus the output of the transmission 50. By changing a position of the shifter 52, the gears that are engaged in the transmission 50 change, which results in the transmission 50 operating in a different drive mode. A shifter position sensor 84 senses a position of the shifter 52 and sends a signal representative of the shifter position to the control unit 58. In the present implementation, the shifter 52 is mechanically connected to the transmission 50 via a push-pull cable (not shown) that moves a gear selector (not shown) thereby selecting the drive mode. It is contemplated that instead of a mechanical connection, the transmission 50 could be provided with an electric motor coupled to the gear selector and that the electric motor could be controlled by the control unit 58 based on the signal received by the control unit 58 from the shifter position sensor 84. It is also contemplated that the shifter position sensor 84 could sense a position of the gear selector.

The transmission 50 is operatively connected to a front driveshaft 86 and a rear driveshaft 88, also referred to as front and rear drive axles 86, 88. The front driveshaft 86 is connected to a front differential 90. The front differential 90 is connected to two front half-shafts 92. The front half-shafts 92 are connected to the front wheels 20. The rear driveshaft 88 is connected to a rear differential 94. The rear differential 94 is connected to two rear half-shafts 96. The rear half-shafts 96 are connected to the rear wheels 20. Universal joints (not shown) provide the connections between the driveshafts 86, 88, differentials 90, 94, half-shafts 92, 96 and the wheels 20. It is contemplated that the driveshafts 86, 88, and half-shafts 92, 96, although each shown as being unitary shafts, could be made of multiple shafts. It is also contemplated that one of the driveshafts 86, 88 could be omitted in the case of a two-wheel drive vehicle. It is also contemplated that one of the driveshafts 86, 88 could be selectively connected to the transmission 50 thereby permitting the SSV 10 to operate in a two-wheel drive mode or a four-wheel drive mode.

A speed sensor 98 is electrically connected to the control unit 58. The speed sensor 98 senses a speed of rotation of the rear driveshaft 88 and sends a signal representative of this speed to the control unit 58. By knowing the transmission ratio (input speed (i.e. secondary pulley side) over output speed (i.e. driveshaft side)), based on the signal from the shifter position sensor 84, the control unit 58 can determine the secondary pulley speed by multiplying the speed sensed by the speed sensor 98 by the transmission ratio. The control unit 58 also uses the signal from the speed sensor 98 to calculate the vehicle speed, based on the diameter of the wheels 20 and the input to output ratio of the differential 94. It is contemplated that the speed sensor 98 could alternatively sense the speed of rotation of the driveshaft 86, one of the half-shafts 92, 96, a rotating component associated with one of the wheels 20 (a brake disk for example), one of the wheels 20, a rotating element of one of the differentials 90, 94, a shaft of the transmission 50, the input shaft 70 or the secondary pulley 66.

A throttle operator position sensor 100 senses a position of the throttle pedal 42. The throttle operator position sensor 100 is electrically connected to the control unit 58 and sends a signal representative of the position of the throttle pedal 42 to the control unit 58. The throttle pedal 42 is movable between a 0 percent throttle operator position, which is the position of the throttle pedal 42 when the operator completely releases the pedal 42 (illustrated in broken lines in FIG. 2), and a 100 percent throttle operator position, which is the position of the pedal 42 when the operator fully depresses the pedal 42 (solid lines in FIG. 2). The pedal 42 is biased toward the 0 percent throttle operator position. In vehicles using a throttle operator other than a throttle pedal 42, such as a twist grip or a throttle lever for example, the throttle operator position sensor 100 is adapted to sense the position of the particular type of throttle operator. It is contemplated that the throttle operator position sensor 100 could sense the position of an element of the SSV 10 other than the throttle pedal 42 that is moved by the throttle pedal 42, in which case the control unit 58 could determine the throttle operator position by using the positional relationship between the throttle pedal 42 and this element.

A throttle valve actuator 102 is disposed on a left side of the throttle body 54. The throttle valve actuator 102 is connected to the throttle valve 56 to pivot the throttle valve 56 between its various positions. The throttle valve actuator 102 is electrically connected to the control unit 58 and receives signals from the control unit 58. The throttle valve actuator 102 moves the throttle valve 56 based on the signals received from the control unit 58. In the present implementation, the throttle valve actuator 102 is a rotary electrical motor, but other types of throttle valve actuators are contemplated. Systems of this type are sometimes referred to as throttle-by-wire systems.

A throttle valve position sensor 104 senses a position of the throttle valve 56 by sensing a position of a shaft of the throttle valve actuator 102. It is contemplated that the throttle valve position sensor 104 could sense the position of the throttle valve 56 directly. The throttle valve position sensor 104 is electrically connected to the control unit 58 and sends a signal representative of the position of the throttle valve 56 to the control unit 58.

It is contemplated that in alternative implementations of the power pack and of the power train, other sensors could be used in addition to or instead of the sensors described above. For example, the power train could be provided with other sensors such as, but not limited to, air temperature sensors and passive sensors.

During acceleration of the SSV 10, the operator presses on the throttle pedal 42 (shown in a depressed position in FIG. 2) and the engine 44 drives the crankshaft 60, which drives the primary pulley 64. Assuming that the primary pulley 64 is turning at a speed above the primary pulley engagement speed, the primary pulley 64 engages the belt 68 and drives the belt 68, which in turn drives the secondary pulley 66. The secondary pulley 66 drives the input shaft 70. The input shaft 70 drives the transmission 50. The transmission 50, which operates according to the drive mode selected by the shifter 52, drives the driveshafts 86, 88 (unless the transmission 50 is in the neutral mode). The driveshafts 86, 88 drive their respective differentials 90, 94. The differentials 90, 94 then drive their respective wheels 20 via their respective half-shafts 92, 96.

When the operator pushes down on the throttle pedal 42 to drive the engine 44 at a high power, the engine 44 may drive the primary pulley 64 with greater power than the CVT 48 was generally designed to accept, or at higher torque than it is appropriate for a given CVT ratio. Slippage can occur between the belts 68 and the pulleys 64, 66, which can eventually cause heating and damage of the CVT 48 due to friction between the belt 68 and the pulleys 64, 66. As another non-limiting example, in an overdrive mode, the primary pulley 64 is in a fully closed position and the secondary pulley 66 is in a fully opened position. As the CVT 48 is not generally designed to be fully efficient in the overdrive mode (because time spent in the overdrive mode is not high compared to other zones for which the CVT 48 may be better optimized), curves of the sheaves 72, 74, 80, 82 may not contact the belt 68 perfectly and may squeeze the belt 68, which can also cause heating. To limit heating that may lead to damage of the CVT 48 while allowing the operator to take advantage of power available in the engine 44 or the overdrive mode, the control unit 58 controls torque output by the engine 44, based on the CVT ratio of the CVT 48 and on energy accumulated in the CVT 48.

Figure 4:
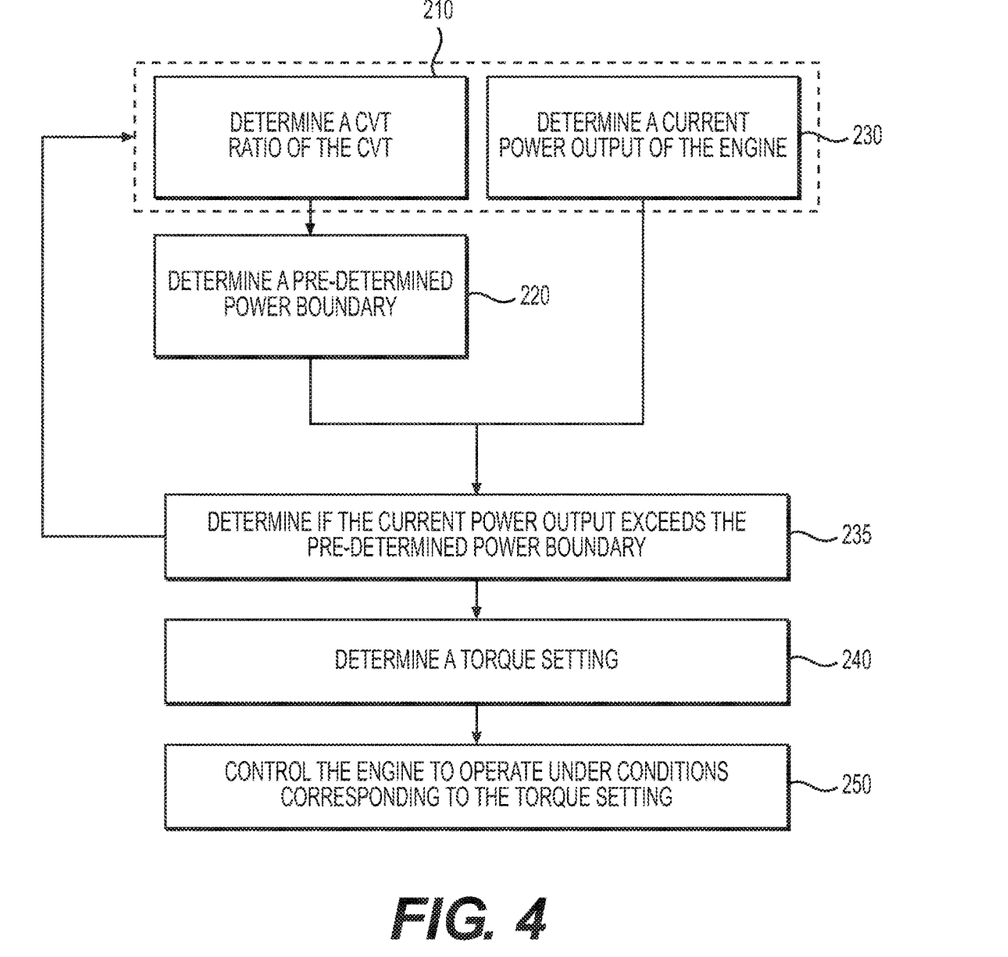
FIG. 4 is a flow chart of a method performed by the SSV of FIG. 1.

One method 200 of controlling the engine 44 according to the present technology will be described with reference to FIG. 4. The method 200 begins, at step 210, with the control unit 58 determining a current power output of the engine 44, the current power output being a value of the power output of the engine 44 determined during a particular iteration of the method 200.

At step 220, the method 200 continues with the control unit 58 determining a pre-determined power boundary based on the current CVT ratio determined at step 210. The pre-determined power boundary, for each given CVT ratio, is a nominal maximum power that the CVT 48 can support for an extended duration. As explained below, the method 200 allows the engine 44 to produce power above this nominal maximum for short periods of time.

At step 230, the method 200 continues with the control unit 58 determining a current power output of the engine 44. The current power output is determined based on a current torque output and a current speed of the engine 44, as will be described below in reference to a method 300. It is contemplated that other procedure or sensors could be used to determine the current power output of the engine 44.

At step 235 of the method 200, the control unit 58 determines if the current power output of the engine 44, determined at step 230, exceeds the pre-determined power boundary determined at step 220. If the current power does not exceed the pre-determined boundary, the CVT 48 is operating within a regime that does not cause unwarranted heating or damage (due to the load). In this case, the method 300 starts over again with the control unit 58 performing steps 210, 220, 230 to determine a new current engine power and a new CVT ratio if any changes in the engine operation and/or CVT ratio have occurred.

When the current power output of the engine does exceed the pre-determined power boundary, at step 240 the control unit 58 determines a limited torque setting for the engine 44. The limited torque setting is determined based at least in part on the difference between the pre-determined power boundary determined at step 220 and the current power determined at step 230. The method 200 then terminates at step 250, where the control unit controls the engine 44 to reduce a torque output of the engine 44 to the limited torque setting. This is especially the case if the limited torque setting is less than a torque requested by the operator, in order to prevent the operator from unnecessarily heating or damaging the CVT 48.

In some implementations, prior to controlling power output of the engine 44, the control unit 58 allows energy (i.e. heat) to accumulate in the CVT 48, the energy accumulated being related to heating of the CVT 48. Then step 250 occurs when the energy accumulated reaches an accumulation limit. As will be described in reference to the method 300 below, the accumulation limit is also referred to as a transient energy value. The method 200 then proceeds with controlling the engine 44 to reduce the torque output of the engine 44 to the limited torque setting at step 250.

In some implementations, the control unit 58 determines that the energy accumulated is greater than zero but less than the accumulation limit. Instead of waiting for the energy accumulation to reach the limit, the method 200 may further include controlling the engine 44 to reduce the torque output of the engine 44 to a reduced torque, the reduced torque being lower than a current torque output of the engine 44 but greater than the limited torque output of the engine 44.

Figure 5:
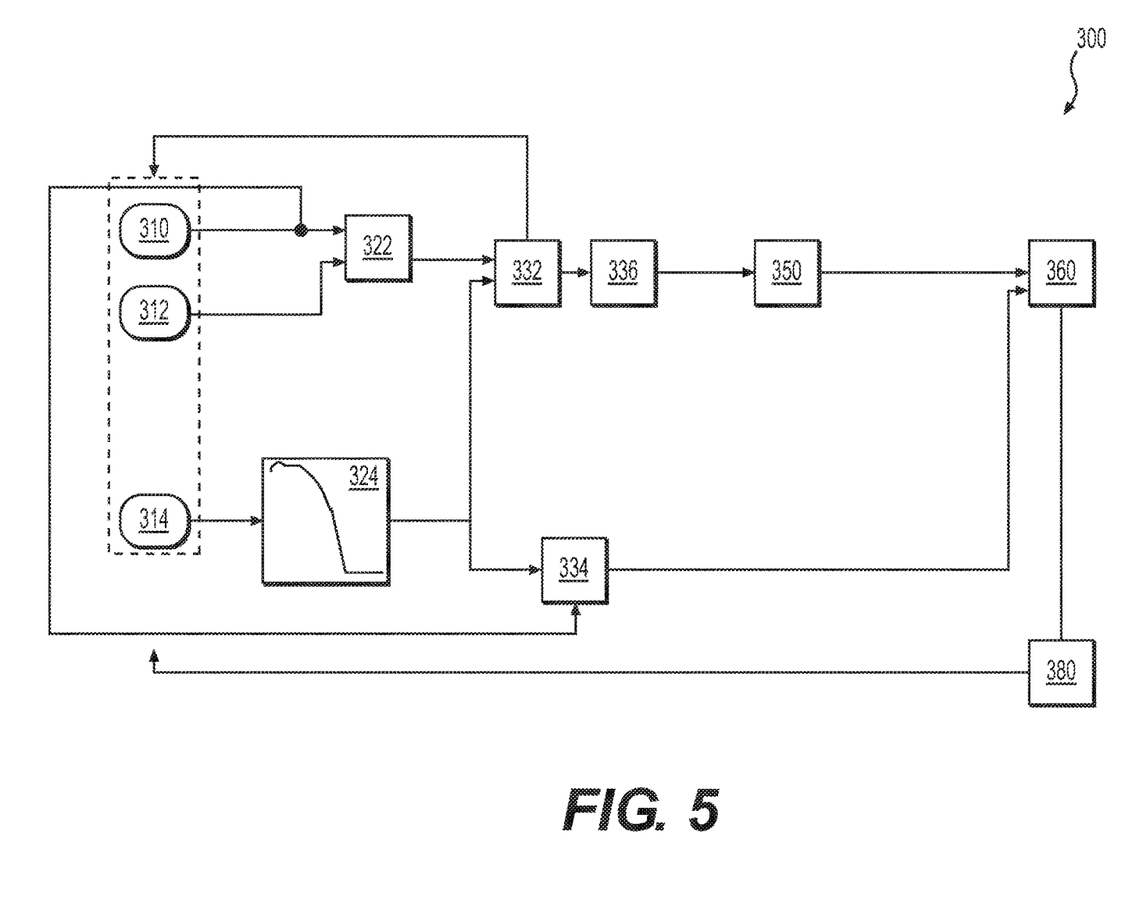
FIG. 5 is a flow chart of another method performed by the SSV of FIG. 1.
Figure 6:
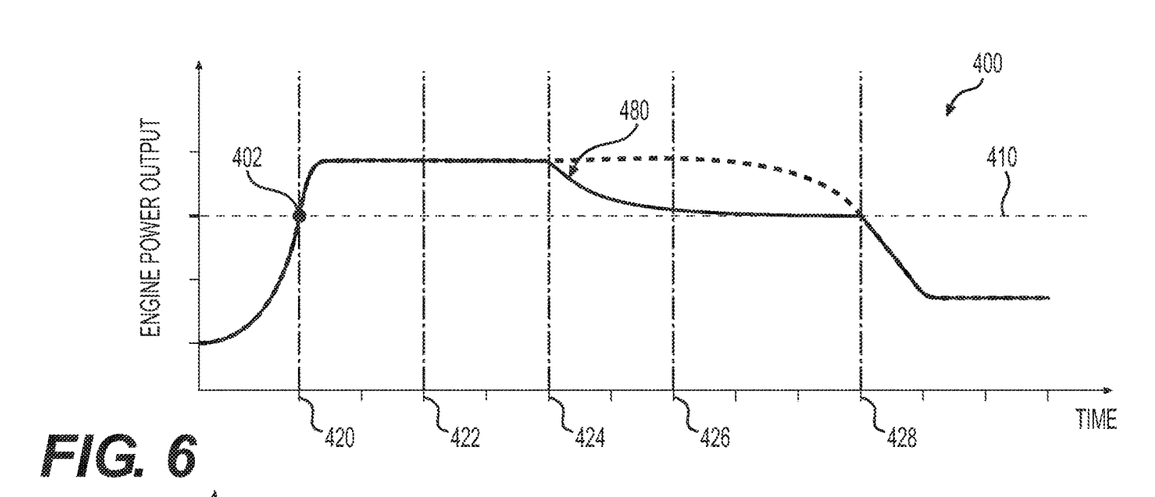
FIG. 6 is a graph illustrating an engine power output by the SSV of FIG. 1 being operated in accordance with the method of FIG. 5.
Figure 7:
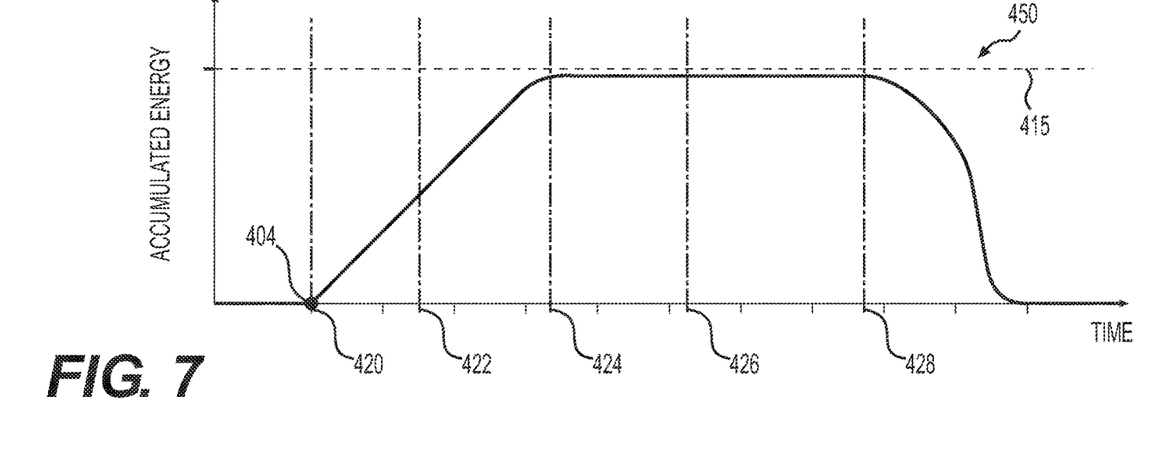
FIG. 7 is a graph illustrating an accumulated energy of the SSV of FIG. 1 being operated in accordance with the method of FIG. 5.

With reference to FIGS. 5 to 7, another implementation of a method 300 according to the present technology will be described. A flow chart of the method 300 for controlling the engine 44 is presented in FIG. 5. An example graph 400 of power output of the engine 44 is illustrated in FIG. 6. An accumulated energy graph 450 for energy accumulation in the CVT 48 in a SSV 10 implementing the method 300 is illustrated in FIG. 7. The graphs 400, 450 simply represent one non-limiting scenario of implementation of the method 300 to provide further understanding of the method 300. The x-axis of the graphs 400, 450 are identical and represent a time at which the method 300 is carried out. Just as an example, at a time 420, the method 300 determines that a current power output of the engine 44 is an engine power output 402 (FIG. 6). At the same time 420 in FIG. 7, the graph 450 shows that the control unit 58, in accordance with the method 300, has determined that the CVT 48 has an accumulated energy 404. (Details of these method steps will be presented below).

The method 300 begins with determining a current engine speed at step 310 by the control unit 58 based on signals received from the engine speed sensor 62. At step 312, the method 300 continues with the control unit 58 determining a current engine torque. The control unit 58 calculates the current engine torque based on a number of factors, which can include, but is not limited to, a current amount of fuel being injected into the engine 44 and a current position of the throttle valve 56 determined using the throttle valve position sensor 104.

The method 300 continues with determining a current engine power at step 322 by the control unit 58 by multiplying the current torque determined at step 312 by the current engine speed determined at step 310. In the graph 400, the engine power output determined at step 322 by the control unit 58 is represented by a solid line 480.

Also at the beginning of the method 300, the control unit 58 determines a current CVT ratio at step 314. First, a speed of rotation of the crankshaft 60 operatively connecting the engine 44 to the primary pulley 74 is determined using the sensor 62. Then a speed of the driveshaft 88 is then determined using the speed sensor 98. The control unit 58 then calculates the CVT ratio, as it is proportional to the speed of the crankshaft 60 divided by the speed of the drive shaft 88. As described above, the control unit 58 determines the secondary pulley speed by multiplying the speed sensed by the speed sensor 98 by the transmission ratio of the transmission 50. It is contemplated that a sensor measuring a speed of the input shaft 70 directly could be used for determining the CVT ratio.

The method 300 then continues with determining, by the control unit 58 at step 324, a pre-determined power boundary based on the current CVT ratio. The control unit 58 retrieves the pre-determined power boundary appropriate for the determined CVT ratio from a stored power boundary data set stored in the memory unit 59 operatively connected to the control unit 58. It is contemplated that the control unit 58 could retrieve the pre-determined power boundary based on the CVT housing temperature determined using the temperature sensor 47 in place of, or in addition to, the CVT ratio. In such an implementation, the control unit 58 would retrieve the pre-determined power boundary based on information received by the control unit 58 from the CVT temperature sensor 47. As the CVT housing temperature is generally proportional to a temperature of the CVT components 64, 66, 68, limiting the power output by the engine 44 based on the CVT housing temperature can aid in limiting overheating of the CVT components 64, 66, 68. In graph 400 of FIG. 6, the pre-determined power boundary is represented by a dashed line 410 and is constant over the time represented in the example presented in FIGS. 6 and 7. It should be noted that the pre-determined power boundary may have different values for different CVT ratios and thus the pre-determined power boundary may vary over time as the CVT ratio changes during operation. The constant pre-determined power boundary of the line 410 in the graph 400 is only a simplification made for ease of understanding.

It is contemplated that the steps 310, 312, and 314 can be performed in any order, or simultaneously. It is also contemplated that the steps 322 and 324 could be performed in any order or simultaneously.

At step 332, the control unit 58 determines if the current power of the engine 44 determined at step 322 exceeds the pre-determined power boundary determined at step 324. If the current power does not exceed the pre-determined boundary, the CVT 48 is operating within a regime that does not cause unwarranted heating or damage (due to the load). In some such instances, the method 300 starts over again to determine a new current engine power and a new CVT ratio if any changes in the engine operation and/or CVT ratio have occurred. For example, in FIG. 6, this is the case at any time before the time 420, where the engine power output 480 is below the pre-determined power boundary line 410. In other instances, where the current power does not exceed the pre-determined boundary, the method 300 continues as will be described below, instead of recommencing the method 300.

If at step 332 the control unit 58 determines that the current power of the engine 44 determined at step 322 exceeds the pre-determined power boundary determined at step 324, then the method 300 continues at step 336 to determine an accumulated energy (generally representative of heat accumulating in the CVT 48). According to the method 300, the control unit 58 monitors an energy accumulation, up to a maximum energy accumulation. This allows the CVT 48 to operate, for a short period of time, above a power threshold (the pre-determined power boundary) that may cause damage in the long run. In FIG. 7, the accumulated energy determined at step 336 is illustrated in graph 450. In iterations of the method 300 occurring from the times 422 and 426, it can be seen that the CVT 48 has begun to accumulate energy (begun heating up). The control unit 58 is allowing the engine 44 to run above the pre-determined power boundary, and as such energy (heat) is accumulating in the CVT 48.

As will be described in more detail below, a transient energy value, stored to the memory unit 49, is the maximum amount of energy allowed to be accumulated in the CVT 48. In some implementations, the transient energy value is the value of energy that can be accumulated before damage is incurred. In some implementations, the transient energy value is a value of energy that is well-below any damage threshold. In graph 450 of FIG. 7, the transient energy value is represented by the dashed line 415. As can be seen at times 424, 426 and 428, the CVT 48 has accumulated nearly the maximum energy (the transient energy value, line 415). The control unit 58, according to the method 300, generally does not allow the engine 44 to run above the pre-determined power boundary long enough to accumulate more than the transient energy value, in order to prevent approaching a damage threshold, as will be described below. It should be noted that the actual energy accumulated in the CVT 48 may surpass the transient energy value, depending on factors such as, but not limited to, frequency of iterations of the method 300 and time delays between sensors and the control unit 58.

The accumulated energy determined at step 336 is dependent on a power difference and an overrun time. The power difference is an amount of power by which the current power of the engine 44 exceeds the pre-determined power boundary. The overrun time is the time since the engine 44 has been producing more power than the value of the pre-determined power boundary. The accumulated energy is thus determined by how long the engine power has been greater than the pre-determined power boundary and by how much. If the power difference is constant over time, the accumulated energy can be calculated by multiplying the power difference by the overrun time. In practice, due to variations in the power difference, the calculation will be more complex.

At step 334, the method 300 continues with the control unit 58 determining a theoretical maximum torque for the current CVT ratio determined at step 314. The theoretical maximum torque is a value of torque under which the CVT 48 can operate under for long durations without sustaining damage from accumulated heat, and is calculated by dividing the pre-determined power boundary determined at step 324 by the current engine speed determined at step 310.

At step 350, the control unit 58 determines an energy ratio to be used to determine a torque setting for the engine 44. The energy ratio represents how close the energy accumulated thus far by the CVT 48 is to the maximum allowed energy accumulation. The energy ratio is specifically calculated by dividing the transient energy value by the accumulated energy determined in step 336. The transient energy value is stored in the memory 59 and is retrieved by the control unit 58 during step 350.

Then, at step 360, the control unit 58 determines a torque setting to which the engine 44 will be limited. The torque setting is determined by multiplying the energy ratio determined at step 350 by the theoretical maximum torque determined at step 334.

At step 380 of the method 300, the control unit 58 controls the engine 44 to operate under conditions corresponding to the torque setting determined at step 360. Generally, step 380 only occurs when the torque setting is less than a torque requested by the operator. Controlling the engine 44 at step 380 includes positioning a valve controlling a supply of air to the engine 44 at a position causing the engine 44 to reduce torque to the torque setting, specifically the throttle valve 56. It is contemplated that the control unit 58 could cause different changes to operating conditions of the engine 44 to reduce torque to the torque setting.

As can be seen from the time 424 to the time 428 in the example of FIGS. 6 and 7, the control unit 58 has controlled the engine 44 to operate under conditions corresponding to a reduced torque setting determined at step 360, causing the engine power output to decrease. As the accumulated energy nears the transient energy value (line 415), the control unit 58 causes the engine 44 to decrease the engine power output down to the pre-determined power boundary (line 410). The control unit 58 reduces the engine power output even though the operator is requesting a higher power from time 424 to time 428, as represented by a dotted line 485.

Subsequent to controlling the engine 44 to operate under conditions corresponding to the torque setting at step 380, the method 300 recommences by repeating the steps described above, starting at steps 310, 312, and 314.

During a subsequent iteration of step 314, the control unit 58 determines a revised CVT ratio of the CVT 48. The revised CVT ratio is simply the CVT ratio determined by the control unit 58 (by the procedure outlined above) during the subsequent iteration of the method 300 described here. The revised values described here and below have no substantive difference from the values referred to as current, and are only employed to delineate between first and subsequent iterations of the method 300.

During a subsequent iteration of step 324, the control unit 58 retrieves a revised power boundary based at least in part on the revised CVT ratio determined in the subsequent iteration of step 314.

Similarly, the control unit 58 determines a revised engine speed (subsequent iteration of step 310) and a revised engine torque (subsequent iteration of step 312). Then, the control unit 58 determines a revised power output of the engine 44 during a subsequent iteration of step 322. Then the method 300 continues with the control unit 58 determining a revised power difference by subtracting the revised power boundary from the revised power output of the engine.

When the revised power output is less than the revised power boundary, the method 300 continues with the control unit 58 determining an energy reduction based on the revised power difference and a reduction time. The reduction time corresponds to a time elapsed since power output of the engine 44 has been less the revised power boundary. In this way, the control unit 58 can account for energy dissipation in the CVT 48 in order to allow the CVT 48 to accumulate energy anew. This can be seen from time 428 on in the graph 450, where the operator has requested a power output less than the pre-determined power boundary (line 410, graph 400), and the energy accumulation in the graph 450 is decreasing over time. The control unit 58 then determines a revised accumulated energy by subtracting the energy reduction from the accumulated energy previously determined at the first iteration of step 336 described above.

When the revised accumulated energy is zero, the CVT 48 has had enough time to cool and dissipate the energy previously accumulated. The method 300 then generally allows the torque output of the engine 44 to increase as requested by the operator using the throttle pedal 42, until such a time as the control unit 58 begins to limit throttle output, according to the method 300. Negative values of the revised accumulated energy are considered to be the same as zero. The operator need not wait until the CVT 48 has had enough time to completely dissipate the accumulated energy in order to have full power output. At points in the method 300 where the revised accumulated energy is greater than zero, but less than the transient energy value, the method 300 allows the engine power output to be that requested by the operator, even if it is above the power boundary, until once again the accumulated energy reaches the transient energy value.

When the revised accumulated energy is greater than zero, step 350 is then repeated by the control unit 58 to determine a revised energy ratio by dividing the transient energy value by the revised accumulated energy. The control unit 58 then determines a revised torque setting based on the revised energy ratio (at step 360 of the subsequent iteration of the method 300) and controls the engine 44 to operate under conditions corresponding to the revised torque setting, if the revised torque setting is less than a torque requested by the operator (at step 380 of the subsequent iteration of the method 300).

In some cases, the operator can increase torque before the CVT 48 has completely cooled (and the revised accumulated energy is greater than zero). Specifically, if the revised torque setting is greater than the torque requested by the operator, the control unit 58 simply controls the engine 44 to operate under conditions corresponding to the torque requested by the operator.

When the revised power output is greater than the revised power boundary, the subsequent iteration of the method 300 generally includes additionally repeating at least the steps 312, 336, 350, 360, and 380. Depending on the specific implementation and iteration, any of the above described steps may be carried out. The control unit 58 determines a revised torque output (step 312).

The control unit 58 then determines a revised accumulated energy based on at least the revised power difference and determines a revised energy ratio by dividing the transient energy value by the revised accumulated energy. The transient energy value is not revised in this or any subsequent iterations of the method 300, as the transient energy value is a fixed maximum value that is stored to the memory 59 or the control unit 58. It is contemplated that the transient energy value could depend on factors unrelated to the method 300 itself, including, but not limited to, a temperature of the air surrounding the SSV 10. For example in some implementations, a colder environment surrounding the SSV 10 could induce faster cooling of the CVT 48, allowing a higher transient energy value for the CVT 48.

The control unit 58 then determines a revised torque setting based at least on the revised energy ratio and controls the engine 44 to operate under conditions corresponding to the revised torque setting, if the revised torque setting is less than the torque requested by the operator.

The method 300 then repeats generally for the duration of operation of the vehicle 10. It is contemplated that the frequency of repeating iterations of the method 300 may depend on the specific implementation.

The method 200, the method 300, and the vehicle 10 implemented in accordance with some non-limiting implementations of the present technology can be represented as presented in the following numbered clauses.

CLAUSE 1. A method (200, 300) for controlling a motor (44) of a vehicle (10), the vehicle (10) comprising the motor (44); a control unit (58); a continuously variable transmission (CVT) (48) comprising: a primary pulley (64) operatively connected to the motor (44), a secondary pulley (66), and a belt (68) looped around the primary and secondary pulleys (64, 66), the belt (68) transmitting torque between the primary and secondary pulleys (64, 66); and at least one ground engaging member (20) operatively connected to the secondary pulley (66); the method (200, 300) being performed at least in part by the control unit (58), the method (200, 300) (200) comprising: determining (210, 314) a CVT ratio of the CVT (48); determining (230) a current power output of the motor (44); determining (220, 324) a pre-determined power boundary based at least in part on the CVT ratio; determining (235, 332), when the current power output of the motor (44) is greater than the pre-determined power boundary, a torque setting based at least in part on the CVT ratio; and controlling (250, 380) the motor (44) to operate under conditions corresponding to the torque setting.

CLAUSE 2. The method (200, 300) of clause 1, wherein: the motor (44) is an internal combustion engine (44); the current power output of the motor (44) is a current output of the engine (44); and controlling (250, 380) the motor (44) to operate under conditions corresponding to the torque setting includes controlling (250, 380) the engine (44) to operate under conditions corresponding to the torque setting.

CLAUSE 3. The method (200, 300) of clause 2, wherein controlling (250) the engine (44) comprises controlling (250, 380) the engine (44) to operate under conditions corresponding to the torque setting if the torque setting is less than a torque requested by an operator.

CLAUSE 4. The method (200, 300) of clause 2 or 3, wherein the pre-determined power boundary is retrieved (314), based on the CVT ratio, from a stored power boundary data set.

CLAUSE 5. The method (200, 300) of clause 2 or 3, further comprising: determining a temperature, the temperature being at least one of an ambient temperature and a temperature within a housing (49) of the CVT (48); and wherein: the pre-determined power boundary is retrieved from a stored power boundary data set based on at least one of the CVT ratio and the temperature.

CLAUSE 6. The method (200, 300) of any one of clauses 2 to 5, wherein determining the current power output of the engine (44) comprises: determining (312) the current torque output; determining (310) a current engine speed; and multiplying (322) the current engine speed by the current torque output.

CLAUSE 7. the method (200, 300) of clause 6, wherein determining (310) the current engine speed includes determining a speed of rotation of a crankshaft (60) operatively connecting the engine (44) to the at least one ground engaging member (20).

CLAUSE 8. The method (200, 300) of any one of clauses 2 to 6, wherein determining (210, 314) the CVT ratio comprises determining a speed of rotation of a crankshaft (60) operatively connecting the engine (44) to the primary pulley (64); and determining a speed of a drive axle (86, 88), the drive axle (86, 88) being operatively connected between the secondary pulley (66) and the at least one ground engaging member (20), the CVT ratio being proportional to the speed of the crankshaft (60) divided by the speed of the drive axle (86, 88).

CLAUSE 9. The method (200, 300) of any one of clauses 2 to 8, further comprising, when the current output power of the engine (44) exceeds the pre-determined power boundary: determining the torque setting based at least in part on an overrun time, the overrun time corresponding to a time elapsed since the power output of the engine (44) has exceeded the pre-determined power boundary; and controlling (250, 380) the engine (44) to operate under conditions corresponding to the torque setting, if the torque setting is less than a torque requested by an operator.

CLAUSE 10. The method (200, 300) of clause 2, wherein determining the torque setting comprises: determining (336) an accumulated energy based at least in part on the power difference and an overrun time; determining (350) an energy ratio by dividing a transient energy value by the accumulated energy; determining (334) a theoretical maximum torque by dividing the pre-determined power boundary by the current engine speed; and multiplying (360) the theoretical maximum torque by the energy ratio.

CLAUSE 11. The method (200, 300) of clause 10, wherein the transient energy value is stored in storage (59) operatively connected to the control unit (58).

CLAUSE 12. The method (200, 300) of any one of clauses 2 to 11, wherein controlling (250, 380) the engine (44) to operate under conditions corresponding to the torque setting comprises: positioning a valve (56) controlling a supply of air to the engine (44) at a position causing the engine (44) to reduce torque to the torque setting.

CLAUSE 13. The method (200, 300) of clause 12, wherein the valve (56) is a throttle valve (56) of a throttle body (54).

CLAUSE 14. The method (200, 300) of any one of clauses 2 to 13, further comprising, subsequent to controlling (250, 380) the engine (44) to operate under conditions corresponding to the torque setting: determining (314) a revised CVT ratio of the CVT (48); retrieving (324) a revised power boundary based at least in part on the revised CVT ratio; determining a revised power output of the engine (44); and determining a revised power difference by subtracting the revised power boundary from the revised power output of the engine (44).

CLAUSE 15. The method (200, 300) of clause 14, further comprising, when the revised power output is less than the revised power boundary: determining an energy reduction based on the power difference and a reduction time, the reduction time corresponding to a time elapsed since power output of the engine (44) has been less the revised power boundary; determining a revised accumulated energy by subtracting the energy reduction from the accumulated energy previously determined; determining a revised energy ratio by dividing the transient energy value by the revised accumulated energy; determining a revised torque setting based on the revised energy ratio; and controlling the engine (44) to operate under conditions corresponding to the revised torque setting, if the revised torque setting is less than a torque requested by an operator.

CLAUSE 16. The method (200, 300) of clause 14, further comprising, when the revised power output is greater than the revised power boundary: determining a revised torque output; determining a revised accumulated energy based at least on the revised power difference; determining a revised energy ratio by dividing the transient energy value by the revised accumulated energy; determining a revised torque setting based at least on the revised energy ratio; and controlling the engine (44) to operate under conditions corresponding to the revised torque setting, if the revised torque setting is less than a torque requested by an operator.

CLAUSE 17. A vehicle (10) comprising: a motor (44); a continuously variable transmission (CVT) (48) comprising: a primary pulley (64) operatively connected to the motor (44), a secondary pulley (66), and a belt (68) looped around the primary and secondary pulleys (64, 66), the belt (68) transmitting torque between the primary and secondary pulleys (64, 66); at least one ground engaging member (20) operatively connected to the secondary pulley (66); and a control unit (58) configured to perform the method (200, 300) of any one of clauses 1 to 16.

CLAUSE 18. A method (200, 300) for controlling an internal combustion engine (44) of a vehicle (10), the vehicle (10) comprising: the internal combustion engine (44); a control unit (58); a continuously variable transmission (CVT) (48) comprising: a primary pulley (64) operatively connected to the engine (44), a secondary pulley (66), and a belt (68) looped around the primary and secondary pulleys (64, 66), the belt (68) transmitting torque between the primary and secondary pulleys (64, 66); and at least one ground engaging member (20) operatively connected to the secondary pulley (66); the method (200, 300) being performed at least in part by the control unit (58), the method (200, 300) comprising: determining (235, 332) that a current power output of the engine (44) has exceeded a pre-determined power boundary of the engine (44); when the current power output of the engine (44) has exceeded the pre-determined power boundary, controlling (250, 380) the engine (44) to reduce a torque output of the engine (44) to a limited torque setting.

CLAUSE 19. The method (200, 300) of clause 18, wherein the pre-determined power boundary is based at least in part on a current CVT ratio of the CVT (48).

CLAUSE 20. The method (200, 300) of clause 18 or 19, further comprising, when the current power output of the engine (44) has exceeded the pre-determined power boundary: prior to controlling power output of the engine (44), allowing energy to accumulate in the CVT (48), the energy accumulated being related to heating of the CVT (48); and controlling the engine (44) to reduce the torque output of the engine (44) to the limited torque setting when the energy accumulated reaches an accumulation limit.

CLAUSE 21. The method (200, 300) of clause 20, further comprising: determining that the energy accumulated is greater than zero but less than the accumulation limit; and when the energy the engine (44) accumulated is greater than zero but less than the accumulation limit, controlling the engine (44) to reduce the torque output of the engine (44) to a reduced torque, the reduced torque being lower than a current torque but greater than the limited torque.

CLAUSE 22. The method (200, 300) of clause 18 or 19, wherein controlling (250, 380) the engine (44) to reduce the torque output of the engine (44) comprises controlling (250, 380) the engine (44) to operate under conditions corresponding to the limited torque setting if the limited torque setting is less than a torque requested by an operator.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for controlling a motor of a vehicle, the vehicle comprising:
    the motor;
    a control unit;
    a continuously variable transmission (CVT) comprising:
        a primary pulley operatively connected to the motor,
        a secondary pulley, and
        a belt looped around the primary and secondary pulleys, the belt transmitting torque between the primary and secondary pulleys; and
    at least one ground engaging member operatively connected to the secondary pulley;

the method being performed at least in part by the control unit, the method comprising:
   determining a CVT ratio of the CVT;
   determining a current power output of the motor;
   determining a pre-determined power boundary of the motor based at least in part on the CVT ratio;
   in response to the current power output of the motor being greater than the pre-determined power boundary of the motor, determining a torque setting based at least in part on the CVT ratio; and
   controlling the motor to operate under conditions corresponding to the torque setting.

2. The method of claim 1, wherein:
   the motor is an internal combustion engine;
   the current power output of the motor is a current output of the engine;
   the pre-determined power boundary of the motor is a pre-determined power boundary of the engine; and
   controlling the motor to operate under conditions corresponding to the torque setting includes controlling the engine to operate under conditions corresponding to the torque setting.

3. The method of claim 2, wherein controlling the engine comprises controlling the engine to operate under conditions corresponding to the torque setting in response to the torque setting being less than a torque requested by an operator.

4. The method of claim 2, wherein the pre-determined power boundary is retrieved, based on the CVT ratio, from a stored power boundary data set.

5. The method of claim 2, further comprising:
   determining a temperature, the temperature being at least one of an ambient temperature and a temperature within a housing of the CVT; and
   wherein:
      the pre-determined power boundary is retrieved from a stored power boundary data set based on at least one of the CVT ratio and the temperature.

6. The method of claim 2, wherein determining the current power output of the engine comprises:
   determining the current torque output;
   determining a current engine speed; and
   multiplying the current engine speed by the current torque output.

7. The method of claim 6, wherein determining the current engine speed includes determining a speed of rotation of a crankshaft operatively connecting the engine to the at least one ground engaging member.

8. The method of claim 2, wherein determining the CVT ratio comprises:
   determining a speed of rotation of a crankshaft operatively connecting the engine to the primary pulley; and
   determining a speed of a drive axle, the drive axle being operatively connected between the secondary pulley and the at least one ground engaging member,
   the CVT ratio being proportional to the speed of the crankshaft divided by the speed of the drive axle.

9. The method of claim 2, further comprising, when the current output power of the engine exceeds the pre-determined power boundary of the engine:
   determining the torque setting based at least in part on an overrun time, the overrun time corresponding to a time elapsed since the power output of the engine has exceeded the pre-determined power boundary; and
   controlling the engine to operate under conditions corresponding to the torque setting, if the torque setting is less than a torque requested by an operator.

10. The method of claim 2, wherein determining the torque setting comprises:
    determining an accumulated energy based at least in part on the power difference and an overrun time;
    determining an energy ratio by dividing a transient energy value by the accumulated energy;
    determining a theoretical maximum torque by dividing the pre-determined power boundary of the engine by the current engine speed; and
    multiplying the theoretical maximum torque by the energy ratio.

11. The method of claim 10, wherein the transient energy value is stored in storage operatively connected to the control unit.

12. The method of claim 2, wherein controlling the engine to operate under conditions corresponding to the torque setting comprises:
    positioning a valve controlling a supply of air to the engine at a position causing the engine to reduce torque to the torque setting.

13. The method of claim 12, wherein the valve is a throttle valve of a throttle body.

14. The method of claim 2, further comprising, subsequent to controlling the engine to operate under conditions corresponding to the torque setting:
    determining a revised CVT ratio of the CVT;
    retrieving a revised power boundary of the engine based at least in part on the revised CVT ratio;
    determining a revised power output of the engine; and
    determining a revised power difference by subtracting the revised power boundary of the engine from the revised power output of the engine.

15. The method of claim 14, further comprising, in response to the revised power output being less than the revised power boundary of the engine:
    determining an energy reduction based on the power difference and a reduction time, the reduction time corresponding to a time elapsed since power output of the engine has been less the revised power boundary of the engine;
    determining a revised accumulated energy by subtracting the energy reduction from the accumulated energy previously determined;
    determining a revised energy ratio by dividing the transient energy value by the revised accumulated energy;
    determining a revised torque setting based on the revised energy ratio; and
    controlling the engine to operate under conditions corresponding to the revised torque setting, if the revised torque setting is less than a torque requested by an operator.

16. The method of claim 14, further comprising, when the revised power output is greater than the revised power boundary of the engine:
    determining a revised torque output;
    determining a revised accumulated energy based at least on the revised power difference;
    determining a revised energy ratio by dividing the transient energy value by the revised accumulated energy;
    determining a revised torque setting based at least on the revised energy ratio; and
    controlling the engine to operate under conditions corresponding to the revised torque setting, in response to the revised torque setting being less than a torque requested by an operator.

17. A vehicle comprising:
a motor;
a continuously variable transmission (CVT) comprising:
   a primary pulley operatively connected to the motor,
   a secondary pulley, and
   a belt looped around the primary and secondary pulleys, the belt transmitting torque between the primary and secondary pulleys;
at least one ground engaging member operatively connected to the secondary pulley; and
a control unit configured to perform the method of claim 1.

* * * * *

UNITED STATES PATENT AND TRADEMARK OFFICE
CERTIFICATE OF CORRECTION

PATENT NO. : 10,982,603 B2  
APPLICATION NO. : 16/343167  
DATED : April 20, 2021  
INVENTOR(S) : Jean-Philippe Houle Page 1 of 1

It is certified that error appears in the above-identified patent and that said Letters Patent is hereby corrected as shown below:

In the Specification

Column 3, Lines 22-23, "power output of the engine has been less the revised power boundary;" should read --power output the engine has been less than the revised power boundary;--

Column 14, Lines 47-48, "power output of the engine 44 has been less the revised power boundary." should read --power output the engine 44 has been less than the revised power boundary.--

Column 17, Lines 36-38, "power output of the engine (44) has been less the revised power boundary;" should read --power output the engine (44) has been less than the revised power boundary;--

In the Claims

Claim 15, Column 20, Lines 40-41, "power output of the engine has been less the revised power boundary" should read --power output the engine has been less than the revised power boundary--

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*